(12) United States Patent
Yonehara et al.

(10) Patent No.: US 10,245,988 B2
(45) Date of Patent: Apr. 2, 2019

(54) VEHICLE SEAT PROVIDED WITH SEAT BELT RETRACTOR

(71) Applicants: TS TECH CO., LTD., Asaka-shi, Saitama (JP); HONDA MOTOR CO., LTD., Minato-ku, Tokyo (JP)

(72) Inventors: Hidetaka Yonehara, Tochigi (JP); Kazuya Miyawaki, Tochigi (JP); Hiroyuki Nomura, Tochigi (JP); Atsushi Okimura, Tochigi (JP); Hiroki Ikeda, Wako (JP); Toshimitsu Mizukoshi, Wako (JP); Yuma Oga, Wako (JP)

(73) Assignees: TS TECH CO., LTD., Saitama (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/630,212

(22) Filed: Jun. 22, 2017

(65) Prior Publication Data

US 2017/0368974 A1 Dec. 28, 2017

(30) Foreign Application Priority Data

Jun. 24, 2016 (JP) .................................. 2016-125330

(51) Int. Cl.
*B60N 2/68* (2006.01)

(52) U.S. Cl.
CPC .............. *B60N 2/682* (2013.01); *B60N 2/686* (2013.01); *B60N 2/688* (2013.01)

(58) Field of Classification Search
CPC ......... B60N 2/682; B60N 2/688; B60N 2/686

(Continued)

(56) References Cited

U.S. PATENT DOCUMENTS 5,676,423 A * 10/1997 Pedronno ............... B60N 2/686
297/378.1
8,714,641 B2 * 5/2014 Cyoukyu ................. B60N 2/80
297/216.13

(Continued)

FOREIGN PATENT DOCUMENTS

CN 103040267 A 4/2013
CN 203592917 U 5/2014

(Continued)

OTHER PUBLICATIONS

Search Report under Section 17(5) issued for counterpart British Patent Application No. 1710035.5, dated Dec. 14, 2017, 4 pages.

(Continued)

*Primary Examiner* — Milton Nelson, Jr.
(74) *Attorney, Agent, or Firm* — Hamre, Schumann, Mueller & Larson, P.C.

(57) ABSTRACT

A vehicle seat including a seat cushion, a seat back, a seat belt, and a seat belt retractor is provided. The vehicle seat includes: a seat back frame comprising: right and left side frames disposed at a distance away from each other in a lateral direction; an upper frame connecting upper end portions of the right side frame and the left side frame; a lower frame connecting lower end portions of the right side frame and the left side frame; and a connecting frame made of a pipe member and disposed at distances away from the right and left side frames and connecting the upper frame and the lower frame; and a first bracket by which the seat belt retractor is attached to the seat back frame. The first bracket is provided on the connecting frame at distances away from the upper frame and the lower frame.

16 Claims, 12 Drawing Sheets

(58) Field of Classification Search
USPC .......................................... 297/452.18, 452.2
See application file for complete search history.

(56) References Cited

U.S. PATENT DOCUMENTS

| | | |
|---|---|---|
| 8,931,850 B2 | 1/2015 | Mitsuhashi et al. |
| 2011/0148174 A1 | 6/2011 | Eckenroth et al. |
| 2013/0093226 A1 | 4/2013 | Mitsuhashi et al. |
| 2017/0259719 A1 | 9/2017 | Hamano et al. |

FOREIGN PATENT DOCUMENTS

| | | |
|---|---|---|
| CN | 204077450 U | 1/2015 |
| CN | 205273239 U | 6/2016 |
| CN | 105882482 A | 8/2016 |
| CN | 206155250 U | 5/2017 |
| JP | 2001171408 A | 6/2001 |
| JP | 2003009985 A | 1/2003 |
| JP | 2006297982 A | 11/2006 |
| WO | 2016016924 A1 | 2/2016 |

OTHER PUBLICATIONS

Office Action issued for Chinese Patent Application No. 201710485598.1, dated Jan. 3, 2019, 13 pages including English translation.

\* cited by examiner

VEHICLE SEAT PROVIDED WITH SEAT BELT RETRACTOR

CROSS REFERENCE TO RELATED APPLICATIONS

The present application claims priority from Japanese Patent Application No. 2016-125330 filed on Jun. 24, 2016, the disclosure of which is incorporated herein by reference in its entirety.

TECHNICAL FIELD

The present invention relates to a vehicle seat comprising a seat cushion, a seat back, a seat belt, and a seat belt retractor configured to retract the seat belt.

BACKGROUND ART

As a conventional configuration of a seat back frame for an automobile rear seat, JP 2003-009985 A discloses a seat frame, which comprises a U-shaped main frame, a lower frame connecting lower portions of the main frame, a longitudinal pipe extending between an upper portion of the main frame and the lower frame to bridge a gap therebetween, and a lateral pipe extending between one of right and left frames constituting the main frame and the longitudinal pipe to bride a gap therebetween. In a vehicle seat including such a seat back frame, a seat belt retractor configured to retract a seat belt for a center seat is attached to the lateral pipe through a bracket.

However, according to the conventional configuration of the vehicle seat, an occupant seated on the vehicle seat may experience an uncomfortable contact feeling due to the presence of the lateral pipe of the seat back frame, and the occupant's seating feeling may be impaired. Further, the seat back frame includes a large number of constituent parts, which disadvantageously leads to an increase in workload for assembly of the seat back frame and an increase in weight of the seat back frame.

In view of the above, it would be desirable to provide a vehicle seat which can improve the occupant's seating feeling and which can be comprised of a reduced number of parts to reduce the workload on the assembly and to reduce the weight of the seat back frame.

SUMMARY

According to an aspect of the present invention, there is provided a vehicle seat including a seat cushion, a seat back, a seat belt, and a seat belt retractor configured to retract the seat belt. The vehicle seat comprises: a seat back frame comprising: right and left side frames disposed at a distance away from each other in a lateral direction; an upper frame connecting an upper end portion of the right side frame and an upper end portion of the left side frame; a lower frame connecting a lower end portion of the right side frame and a lower end portion of the left side frame; and a connecting frame disposed at distances away from the right and left side frames and connecting the upper frame and the lower frame, the connecting frame being made of a pipe member; and a first bracket by which the seat belt retractor is attached to the seat back frame. The first bracket is provided on the connecting frame at distances away from the upper frame and the lower frame.

With this configuration, no lateral pipe is required, so that an occupant seated on the vehicle seat does not experience an uncomfortable contact feeling and the occupant's seating feeling can be improved. Further, since the seat back frame is comprised of the reduced number of parts, the workload on the assembly of the seat back frame can be reduced and the weight of the seat back frame can be reduced.

In the above-described vehicle seat, the first bracket may be provided at a rear side of the connecting frame.

With this configuration, the thickness of a pad material disposed between the occupant seated on the vehicle seat and the seat belt retractor attached to the first bracket can be increased, so that the occupant's seating feeling can be improved further. Further, since the increased thickness of the pad material is ensured, it is possible to improve the degree of flexibility in the attachment position for the first bracket.

In the above-described vehicle seat, the first bracket may be provided at a front side of the connecting frame.

With this configuration, even if a sufficient space is not available at the rear side of the connecting frame, it is possible to attach the first bracket to the connecting frame.

In the above-described vehicle seat, the seat back frame may further comprise a plate member joined to the connecting frame through a plurality of joint portions, and the first bracket may be disposed between two adjacent joint portions.

With this configuration, the attachment strength of the first bracket can be improved.

In the above-described vehicle seat, the seat back frame may comprise: a first pipe member having a U-shaped configuration and configured to form one of the right and left side frames, the connecting frame, and a part of one of the upper and lower frames; and a second pipe member having a U-shaped configuration and configured to form the other one of the right and left side frames, a remaining part of the one of the upper and lower frames, and the other one of the upper and lower frames, the second pipe member being connected to the first pipe member.

This configuration makes it possible to further reduce the number of parts for the seat back frame. Further, the stiffness of the vehicle seat can be enhanced with a simple structure.

In the above-described vehicle seat, the seat back frame may comprise: a third pipe member having a U-shaped configuration and configured to form the right and left side frames, and one of the upper and lower frames; a fourth pipe member configured to form the other one of the upper and lower frames, the fourth pipe member being connected to the third pipe member; and a fifth pipe member configured to form the connecting frame, the fifth pipe member being connected to the third pipe member and the fourth pipe member.

With this configuration, the third pipe member is formed with a simple bent structure, while the fourth pipe member and the fifth pipe member are formed with a non-bent structure. This can lead to low-cost manufacturing of the seat back frame.

Other features and advantages of the present invention will be apparent from the following description taken in conjunction with the accompanying drawings.

DETAILED DESCRIPTION

First Embodiment

The first embodiment of the present invention will be described in detail with reference to the appended drawings.

Figure 1:
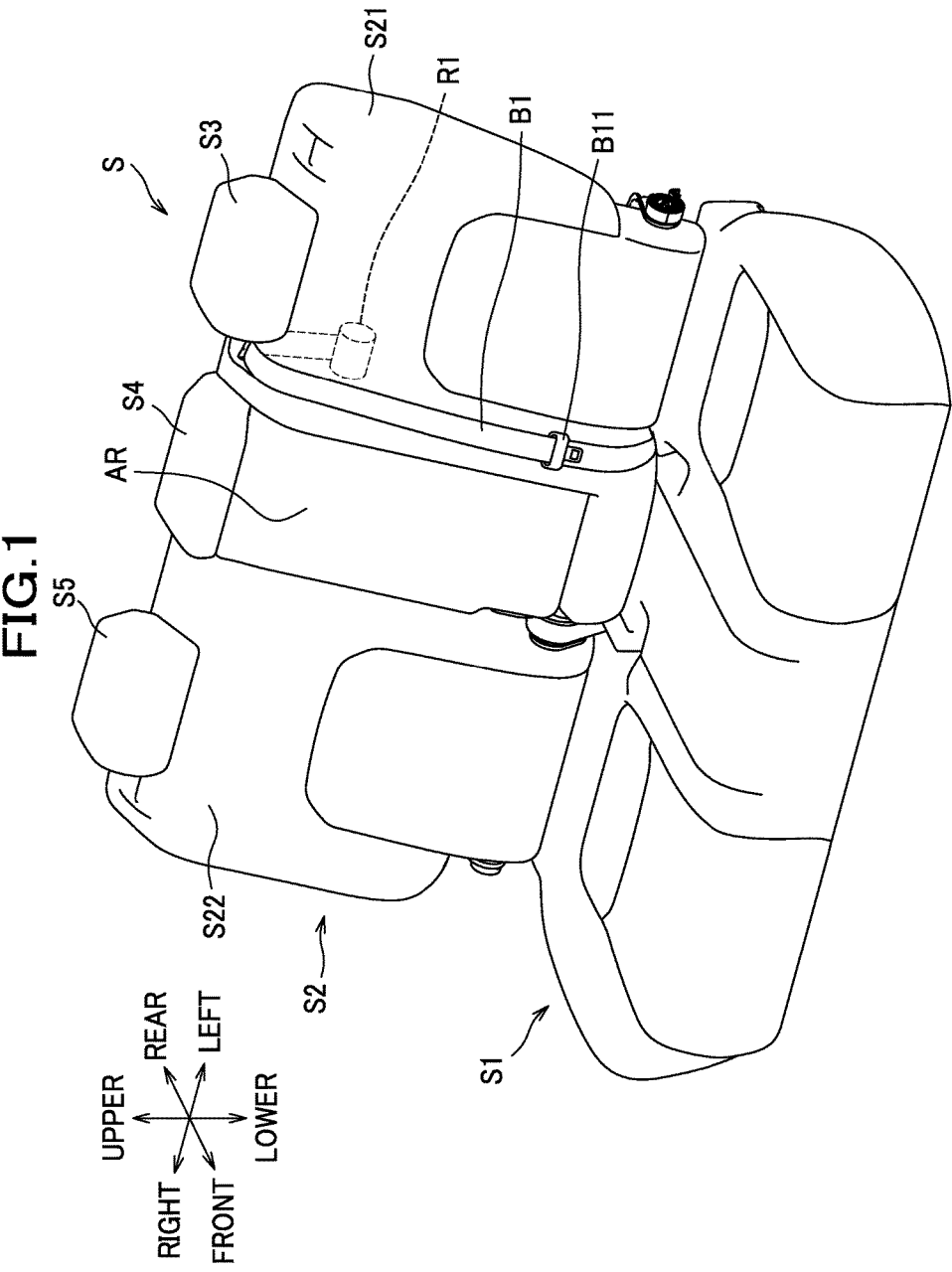
FIG. 1 is a perspective view of a car seat as an example of a vehicle seat.

As seen in FIG. 1, a vehicle seat according to this embodiment is configured as a car seat S installed in an automobile. The car seat S mainly includes a seat cushion S1, a seat back S2, headrests S3, S4, S5, a seat belt B1 for a center seat, a seat belt retractor R1 configured to retract the seat belt B1, and an armrest AR.

Figure 2:
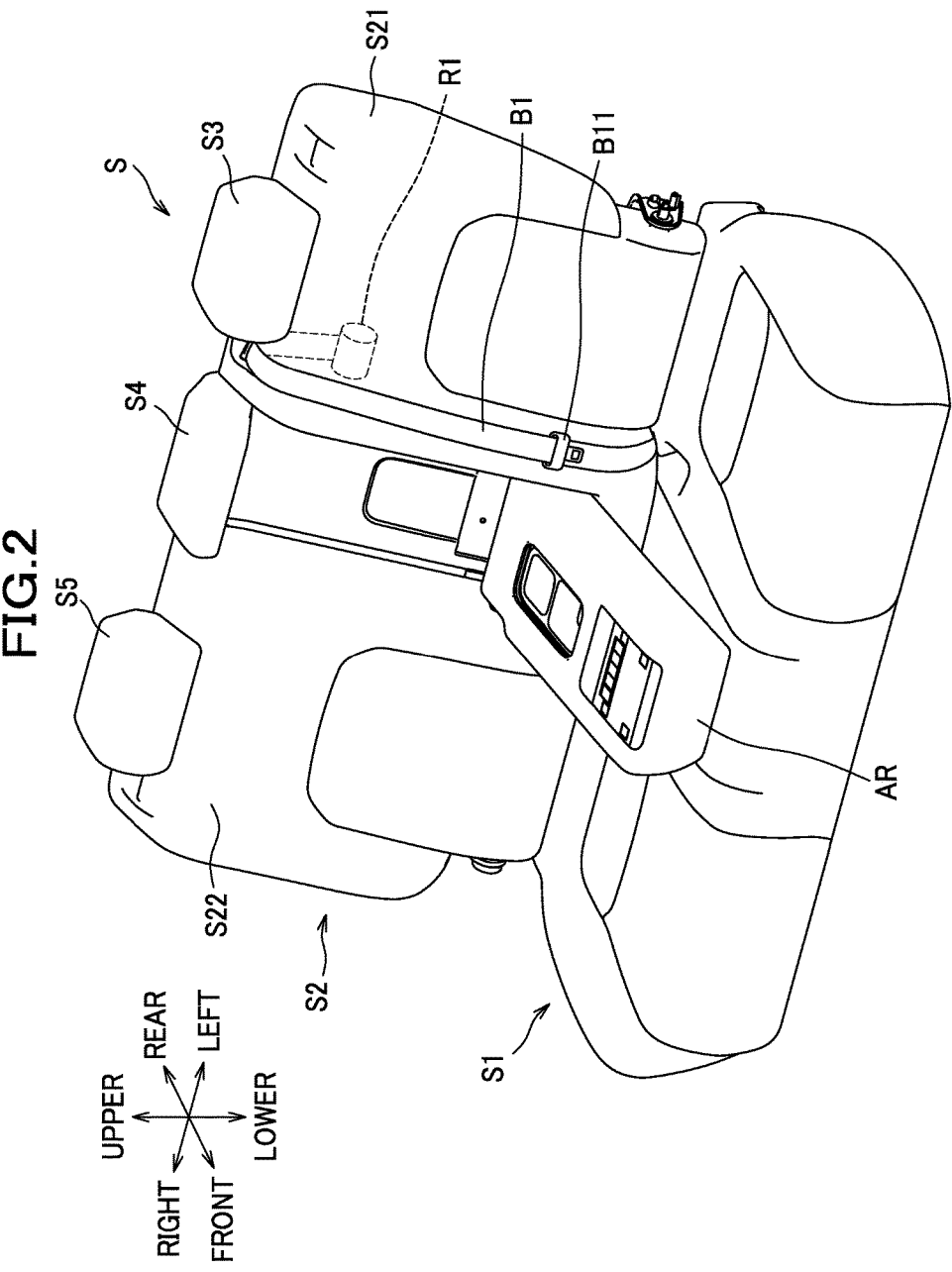
FIG. 2 is a perspective view of the car seat showing a use position of an armrest.

The armrest AR is supported by the seat back S2 and rotatable frontward and rearward with respect to the seat back S2 between a use position as shown in FIG. 2 in which position the armrest AR is to be used and a stowed position as shown in FIG. 1 in which position the armrest AR is retracted into the seat back S2. The armrest AR includes a frame (not shown), and the frame is upholstered with a pad material made of a cushion material such as urethane foam, and an outer skin material made of fabric or the like. In the following description, directions such as front, rear, lateral (right and left), vertical (upper and lower) are designated as from the viewpoint of an occupant seated on the car seat S.

The seat back S2 includes a first seat back S21 disposed on the left side and constituting a seat back for a center seat and a left seat, and a second seat back S22 disposed on the right side of the first seat back S21 and constituting a seat back for a right seat.

Figure 3:
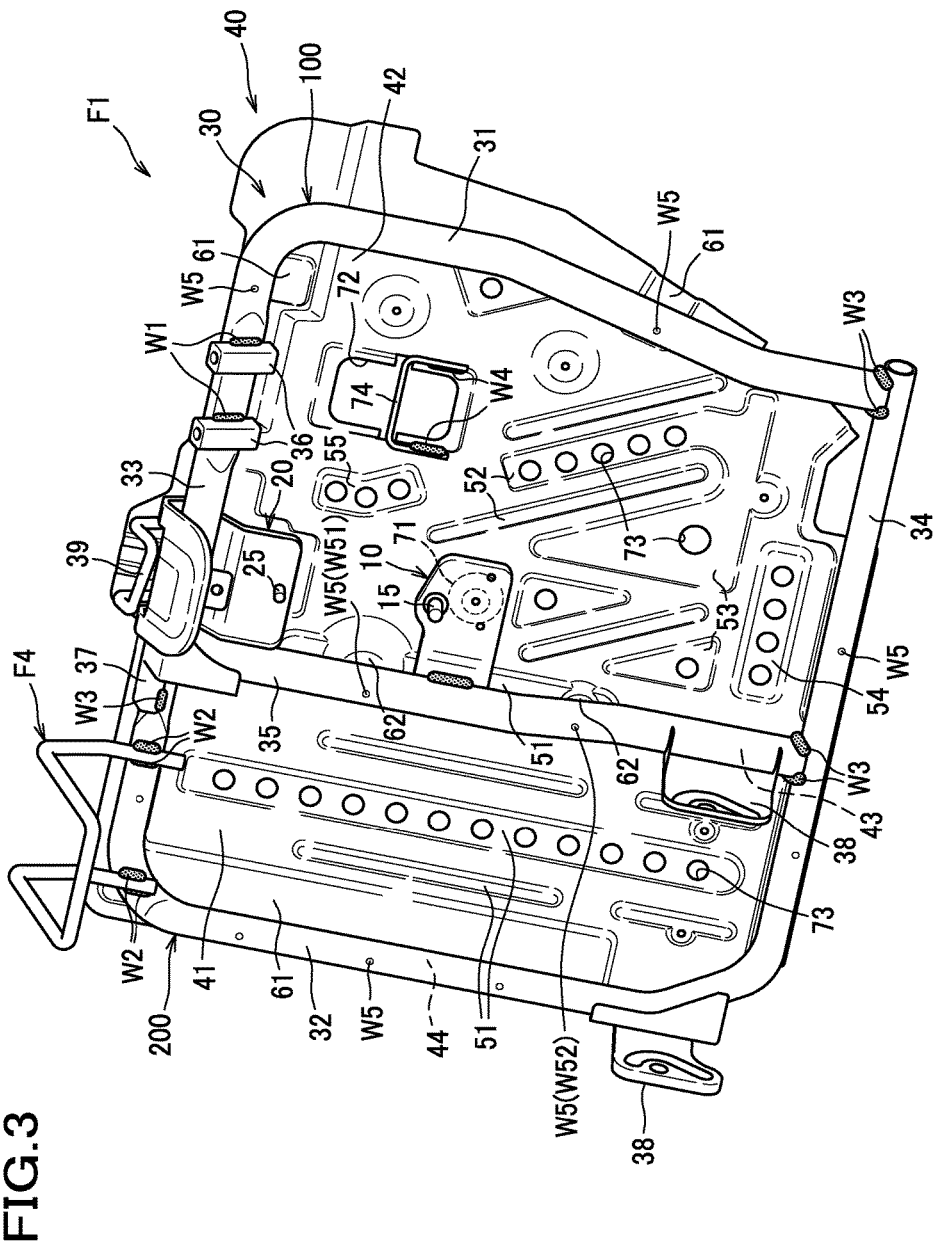
FIG. 3 is a perspective view of a seat back frame according to the first embodiment.

As seen in FIG. 3, the first seat back S21 mainly includes a seat back frame F1 that constitutes a framework, a first bracket 10 and a second bracket 20 by which the seat belt retractor R1 is attached to the seat back frame F1. The first seat back S21 is configured such that the seat back frame F1 is upholstered with a pad material P1 (see FIG. 8) made of a cushion material, and an outer skin material P2 made of fabric or the like.

The seat back frame F1 mainly includes a pipe frame 30, and a back panel 40 as an example of a plate member.

The pipe frame 30 mainly includes left and right side frames 31, 32 disposed at a distance away from each other in a lateral direction, an upper frame 33 configured to connect an upper end portion of the left side frame 31 and an upper end portion of the right side frame 32, a lower frame 34 configured to connect a lower end portion of the left side frame 31 and a lower end portion of the right side frame 32, and a connecting frame 35 configured to connect the upper frame 33 and the lower frame 34. The connecting frame 35 is provided laterally inwardly of and at distances away from the left and right side frames 31, 32 and connects the upper frame 33 and the lower frame 34 on or in the proximity of laterally central portions of the upper frame 33 and the lower frame 34.

Figure 4:
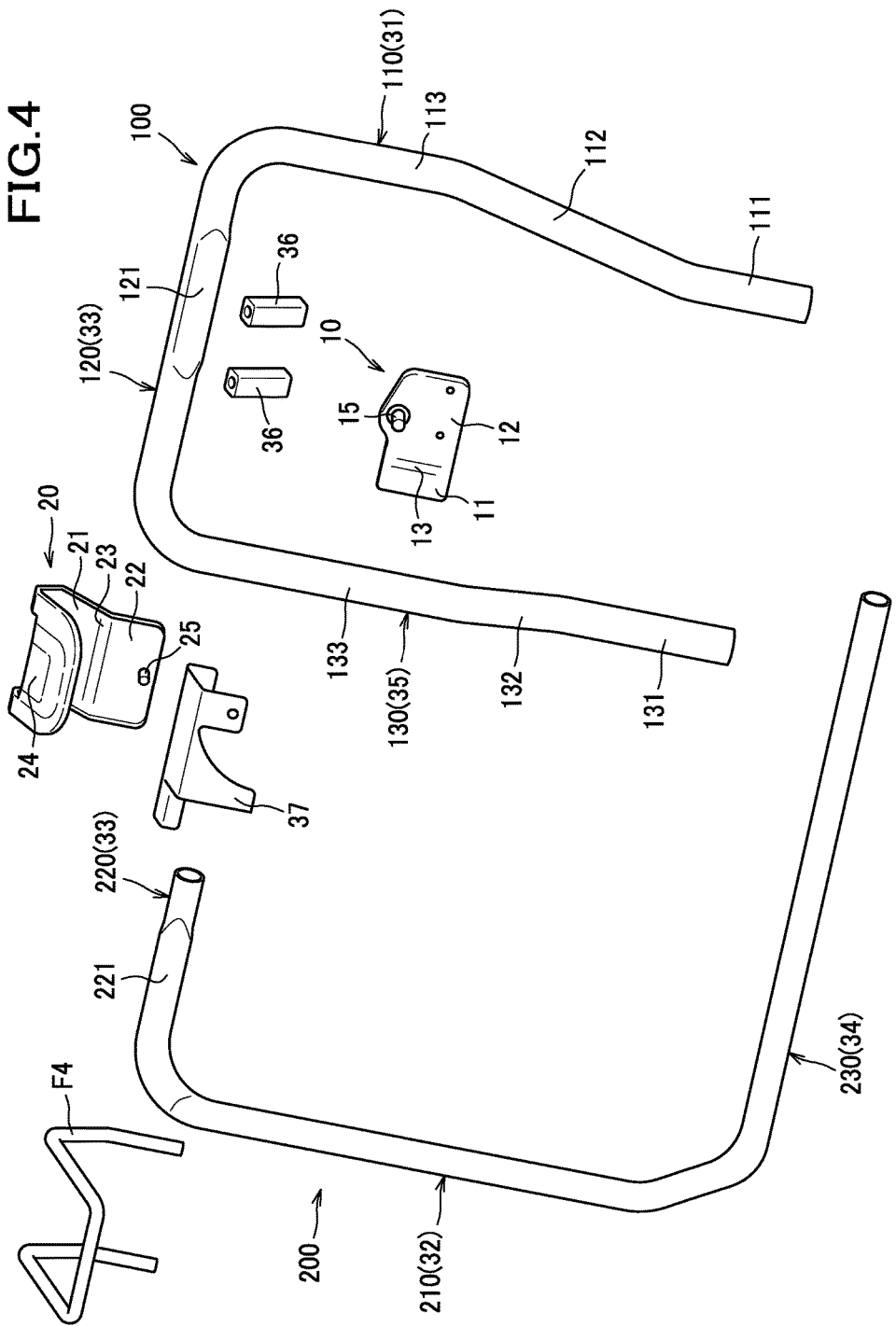
FIG. 4 is an exploded perspective view of a pipe frame according to the first embodiment.

As seen in FIG. 4, the pipe frame 30 includes a first pipe member 100 and a second pipe member 200.

The first pipe member 100 is formed by bending a metallic pipe member into a substantially U-shaped configuration and includes a longitudinal pipe portion 110, a lateral pipe portion 120 bent at an upper end of the longitudinal pipe portion 110 and extending rightward from the upper end of the longitudinal pipe portion 110, and a longitudinal pipe portion 130 bent at a right end of the lateral pipe portion 120 and extending downward from the right end of the lateral pipe portion 120.

The longitudinal pipe portion 110 constitutes the left side frame 31. As viewed from the front side, the longitudinal pipe portion 110 includes a first portion 111 extending substantially in the vertical direction, a second portion 112 extending from the upper end of the first portion 111 in an obliquely upward and laterally outward direction, and a third portion 113 extending substantially in the vertical direction from the upper end of the second portion 112. With this configuration, the seat back frame F1 is configured such that the lateral width of the upper end portion is greater than the lateral width of the lower end portion. Accordingly, the first seat back S21, in which the seat back frame F1 is upholstered with the pad material P1 and the outer skin material P2, can be configured such that the lateral width of the left seat is extended, for example, corresponding to a seat size of a large-side automobile.

The lateral pipe portion 120 constitutes a left-side portion of the upper frame 33 that is a part of the upper frame 33. A pair of right and left headrest-mounting brackets 36, 36 for mounting the headrest S3 (see FIG. 1) are welded to the front side of the lateral pipe portion 120 (see welds W1 in FIG. 3). The lateral pipe portion 120 has a flat portion 121 that is formed by flattening and deforming a part of the pipe member, and the headrest-mounting brackets 36, 36 are welded to the flat portion 121.

The longitudinal pipe portion 130 constitutes the connecting frame 35. As viewed from the lateral direction, the longitudinal pipe portion 130 includes a first portion 131 extending substantially in the vertical direction, a second portion 132 extending from the upper end of the first portion 131 in an obliquely upward and frontward direction, and a third portion 133 extending substantially in the vertical direction from the upper end of the second portion 132 (see also FIG. 7). It should be noted that, as viewed from the lateral direction, the longitudinal pipe portion 110 is also configured such that the second portion 112 extends from the upper end of the first portion 111 in an obliquely upward and frontward direction and is connected to the lower end of the third portion 113 that extends substantially in the vertical direction.

The second pipe member 200 is formed by bending a metallic pipe member into a substantially U-shaped configuration and includes a longitudinal pipe portion 210, a lateral pipe portion 220 bent at an upper end of the longitudinal pipe portion 210 and extending leftward from the upper end of the longitudinal pipe portion 210, and a lateral pipe portion 230 bent at a lower end of the longitudinal pipe portion 210 and extending leftward from the lower end of the longitudinal pipe portion 210. The diameter of the pipe that forms the second pipe member 200 is smaller than the diameter of the pipe that forms the first pipe member 100. In other words, the pipe constituting the second pipe member 200 is thinner than the pipe constituting the first pipe member 100.

The longitudinal pipe portion 210 constitutes the right side frame 32. Unlike the longitudinal pipe portion 110 of the first pipe member 100 that constitutes the left side frame 31, the longitudinal pipe portion 210 extends straight substantially in the vertical direction.

The lateral pipe portion 220 constitutes the right-side portion of the upper frame 33 that is the remaining part of the upper frame 33 excepting the portion constituted by the lateral pipe portion 120 of the first pipe portion 100. A headrest frame F4 that constitutes a framework for the headrest S4 of the center seat (see FIG. 1) is welded to the front side of the lateral pipe portion 220 (see welds W2 in FIG. 3). The lateral pipe portion 220 has a flat portion 221 that is formed by flattening and deforming a part of the pipe member, and the headrest frame F4 is welded to the flat portion 221. The headrest S4 is constituted such that the headrest frame F4 is upholstered with a pad material made of a cushion material and an outer skin material made of fabric or the like.

The lateral pipe portion 230 constitutes the lower frame 34.

As seen in FIGS. 3 and 4, the first pipe member 100 and the second pipe member 200 are joined together to form a pipe frame 30 by welding the lower end of the longitudinal pipe portion 110 and the left end portion of the lateral pipe portion 230, by welding the lower end of the longitudinal pipe portion 130 and a portion on or in the proximity of the laterally central portion of the lateral pipe portion 230, and by welding the left end of the lateral pipe portion 220 and the right end of the lateral pipe portion 120 through a connecting bracket 37 (see welds W3).

The back panel 40 is made by press working sheet metal and includes a first portion 41, a second portion 42, a third portion 43, and a fourth portion 44.

The first portion 41 is a portion surrounded by the right side frame 32, the upper frame 33, the lower frame 34 and the connecting frame 35, and located at the rear of an occupant seated on the center seat of the car seat S. The second portion 42 is a portion surrounded by the left side frame 31, the upper frame 33, the lower frame 34 and the connecting frame 35, and located at the rear of an occupant seated on the left seat of the car seat S. The third portion 43 is a portion located at the rear of the connecting frame 35. The fourth portion 44 is a portion located at the rear of the left and right side frames 31, 32, the upper frame 33 and the lower frame 34, and corresponds to a peripheral portion of the back panel 40.

Figure 5:
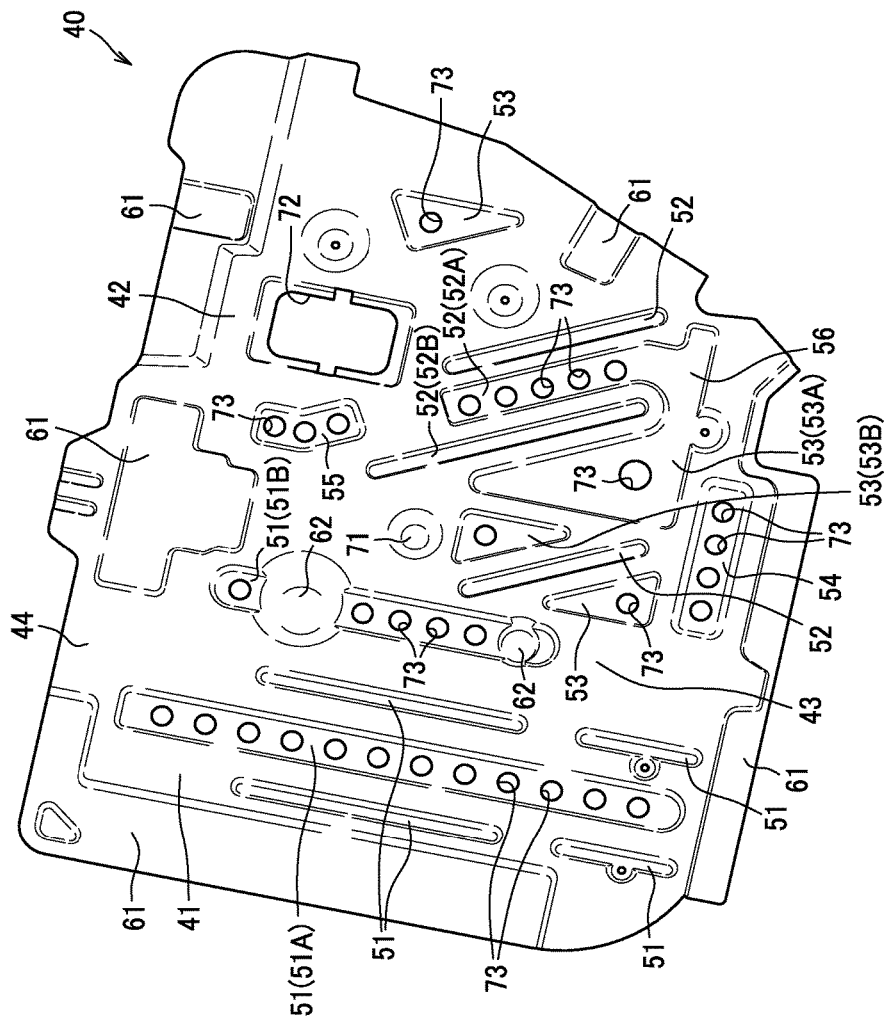
FIG. 5 is a perspective view of a back panel according to the first embodiment.

As seen in FIG. 5, the back panel 40 is provided with a plurality of protruding portions protruding toward the front side that is an example of an occupant side, to enhance the stiffness of the back panel 40. The plurality of protruding portions include first protruding portions 51, second protruding portions 52, third protruding portions 53, a fourth protruding portion 54 and a fifth protruding portion 55. Further, the plurality of protruding portions include first connecting protruding portions 61 and second connecting protruding portions 62 that are connected to the first pipe member 100 and the second pipe member 200 of the pipe frame 30. Further, the back panel 40 is provided with a bracket connecting portion 71 protruding frontward and having a substantially circular shape, and an opening 72 having a substantially rectangular shape.

The first protruding portion 51 is a protruding portion extending substantially in the vertical direction orthogonal to the lateral direction that is an example of a predetermined direction; a plurality of first protruding portions 51 are provided on the first portion 41 and on the third portion 43 such that they are arranged in line in the lateral direction. Of these plurality of first protruding portions 51, each of the wider first protruding portions 51A, 51B has a plurality of substantially circular through-openings 73; the through-openings 73 are arranged in line in the direction in which the first protruding portion 51A, 51B extends. Providing these through-openings 73 can serve to reduce the weight of the back panel 40, so that the weight of the seat back frame F1 can be reduced as a result.

The second protruding portion 52 is a protruding portion extending in a direction inclined with respect to the lateral direction; a plurality of second protruding portions 52 are provided on the second portion 42 such that they are arranged in line in the lateral direction. To be more specific, at an area of the second portion 42 from a portion on or in the proximity of the vertically central portion to the lower portion thereof, the second protruding portions 52 extend substantially parallel to a direction of a line connecting a portion on or in the proximity of the laterally central portion of the upper edge portion of the back panel 40 and the left end portion of the lower edge portion of the back panel 40. Of these plurality of second protruding portions 52, the wider second protruding portion 52A has a plurality of through-openings 73 arranged in line in the direction in which the second protruding portion 52A extends.

The third protruding portion 53 has a substantially triangular shape as viewed from the front side; one third protruding portion 53 is provided at the left end portion of the second portion 42, and a plurality of third protruding portions 53 are provided at the lower portion of the second portion 42. Each of the third protruding portions 53 has one through-opening 73. It should be noted that the left end portion of the third protruding portion 53A and the lower end portion of the second protruding portion 52A are connected by a connecting portion 56 to form an integrally protruding portion protruding toward the front side.

The fourth protruding portion 54 extends in the lateral direction, and is provided at the lower end portion of the second portion 42. The fourth protruding portion 54 has a plurality of through-openings 73 that are arranged in line in the direction in which the fourth protruding portion 54 extends.

The fifth protruding portion 55 includes an upper portion extending substantially in the vertical direction, and a lower portion extending from the lower end of the upper portion in a direction substantially parallel to the second protruding portion 52; the fifth protruding portion 55 is bent at the boundary between the upper and lower portions. The fifth protruding portion 55 is provided on or in the proximity of the laterally central portion of the upper portion of the second portion 42. The fifth protruding portion 55 has a plurality of through-openings 73.

The first connecting protruding portion 61 is connected to the left side frame 31, the right side frame 32, the upper frame 33 or the lower frame 34; a plurality of first connecting protruding portions 61 are provided on the fourth portion 44 that is the peripheral portion of the back panel 40.

The second connecting protruding portion 62 is connected to the connecting frame 35; a plurality of second connecting protruding portions 62 are provided on the third portion 43. To be more specific, each of the second connecting protruding portions 62 is a substantially circular protruding portion, and two second connecting protruding portions 62 are provided one above the other with a space provided therebetween. The second connecting protruding portions 62 are integrally formed with the first protruding portion 51B, and protrude frontward beyond the first protruding portion 51B.

The bracket connecting portion 71 is a portion to which the first bracket 10 is connected; one bracket connecting portion 71 is provided on or in the proximity of the vertically central portion of the right end portion of the second portion 42. The bracket connecting portion 71 is provided at a position between the two second connecting protruding portions 62 in the vertical direction. Further, the bracket connecting portion 71 is provided such that the right and left sides and the lower side thereof are surrounded by the second protruding portion 52B, the first protruding portion 51B and the third protruding portion 53B. As seen in FIG. 3, the opening 72 is a through-opening through which a tether anchor 74 for engagement of a top tether of a child safety seat (not shown) is to be exposed; one opening 72 is provided adjacent to the left side of the fifth protruding portion 55. The peripheral portion adjacent to and surrounding the opening 72 protrudes frontward, so that a sufficient stiffness around the opening 72 is ensured. The tether anchor 74 is made of a wire member that is bent into a substantially U-shaped configuration, and both end portions of the tether anchor 74 are fixed to right and left edge portions of the opening 72 by welding (see welds W4).

The back panel 40 is disposed at the rear of the pipe frame 30, and the plurality of first connecting protruding portions 61 and the frames 31-34 are brought into contact and welded together, while the two second connecting protruding portions 62 and the connecting frame 35 are brought into contact and welded together, so that the pipe frame 30 and the back panel 40 are joined together (see welds W5). It should be noted that a sufficient space is ensured between the pipe frame 30 and the back panel 40 at a portion where the pipe frame 30 and the back panel 40 are not joined together, mainly due to the protruding and recessed shape of the back panel 40 (see FIG. 7). This can suppress abnormal noise such as chatter noise.

The armrest AR (see FIG. 1) is disposed between the right side frame 32 and the connecting frame 35 when it is in a stowed position. In this embodiment, a large storage space for the armrest AR is ensured because the second pipe member 200 constituting the right side frame 32 (longitudinal pipe portion 210) is made of a pipe member that is thinner than the first pipe member 100 constituting the connecting frame 35 (longitudinal pipe portion 130). With this configuration, the thickness of the pad material that covers a frame (not shown) of the armrest AR can be increased. Provided at the lower end portion of the right side frame 32 and at the lower end portion of the connecting frame 35 are a pair of armrest supporting brackets 38, 38 by which the armrest AR is rotatably supported.

Figure 6:
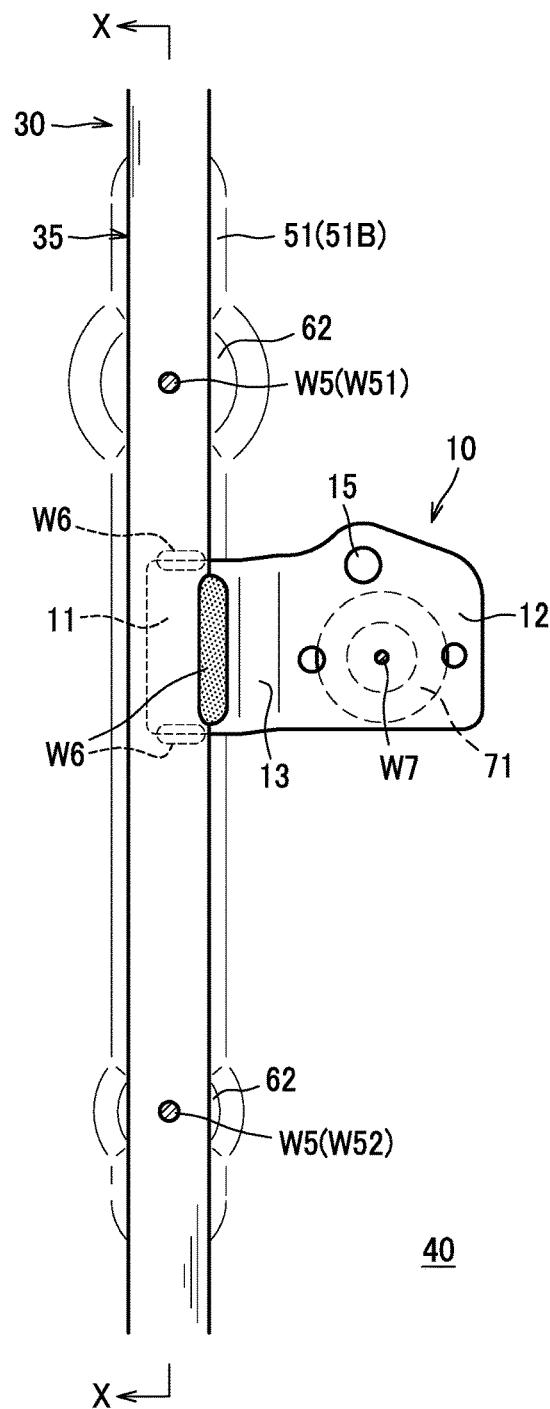
FIG. 6 is a view showing a structure of a part of the seat back frame in which a first bracket is provided, as viewed from the front side.
Figure 8:
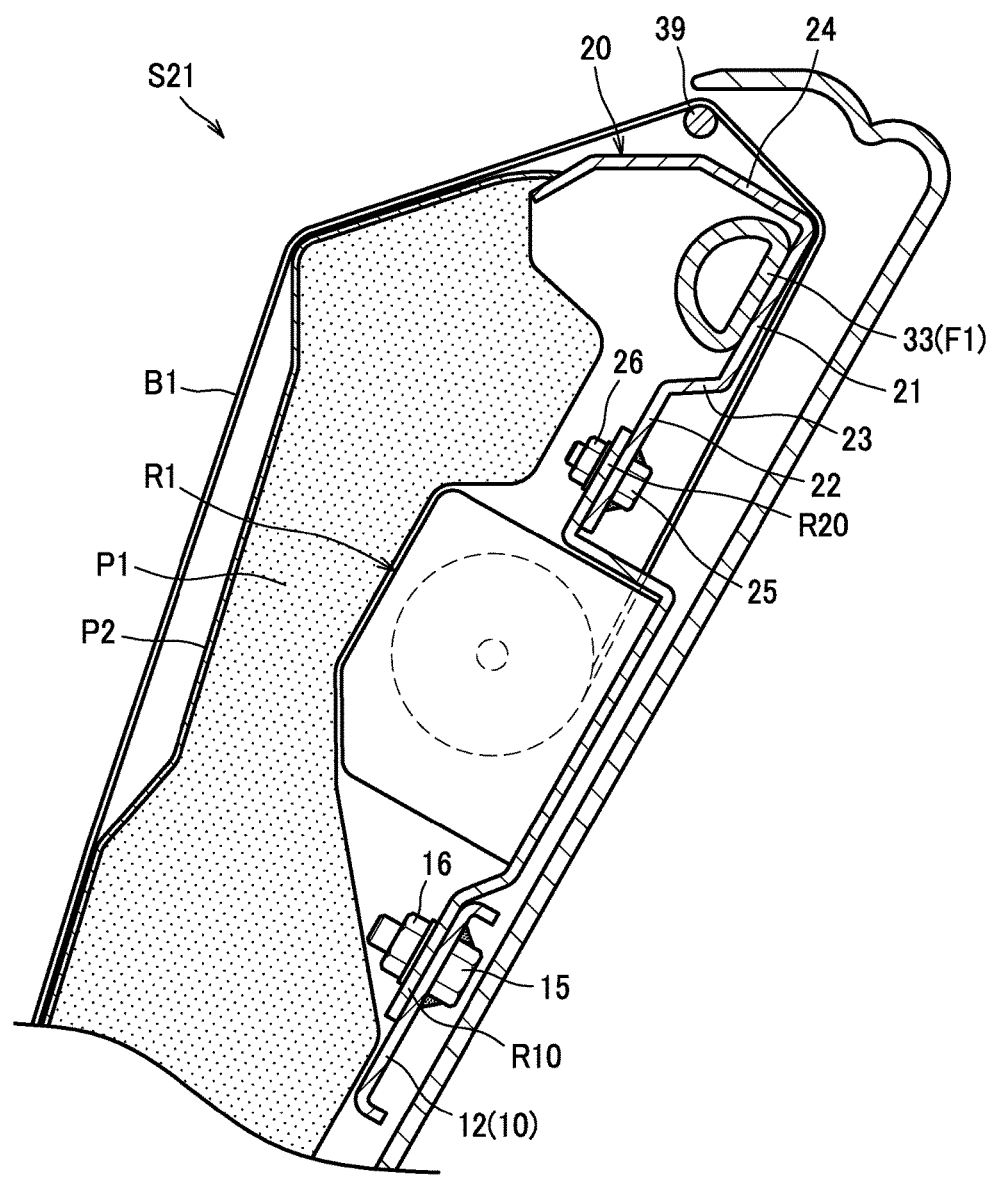
FIG. 8 is a sectional view showing a structure of a part of the seat back in which a seat belt retractor is provided.

As seen in FIG. 6, the first bracket 10 is made by press working sheet metal, and mainly includes an attachment portion 11 attached to the connecting frame 35, an anchorage portion 12 to which the seat belt retractor R1 is fixed, and a connecting portion 13 configured to connect the attachment portion 11 and the anchorage portion 12. The connecting portion 13 extends in an obliquely frontward and leftward direction from the left end of the attachment portion 11, and the anchorage portion 12 extends leftward from the left end of the connecting portion 13. As seen in FIG. 8, a bolt 15 for fixing the seat belt retractor R1 is provided on the anchorage portion 12. The bolt 15 is inserted through a through-opening (not shown) formed in the anchorage portion 12 from the rear side of the anchorage portion 12, and the bolt head thereof is fixed to the rear surface of the anchorage portion 12 by welding. Further, the peripheral edge portion of the first bracket 10 is bent rearward such that corner portions thereof form gently curved surfaces that protrude outside.

As seen in FIG. 6, the attachment portion 11 of the first bracket 10 is brought into contact with a portion on or in the proximity of the vertically central portion of the connecting frame 35 from the rear side of the connecting frame 35, and the upper edge portion, the lower edge portion and the front portion of the attachment portion 11 are joined by welding at three welding spots to the connecting frame 35 (see welds W6), so that the first bracket 10 is attached to the connecting frame 35 (pipe frame 30). Further, the anchorage portion 12 of the first bracket 10 is brought into contact with the bracket connecting portion 71 from the front side of the bracket connecting portion 71 and joined by spot welding (see welds W7) to the bracket connecting portion 71, so that the first bracket 10 is attached to the back panel 40.

Figure 7:
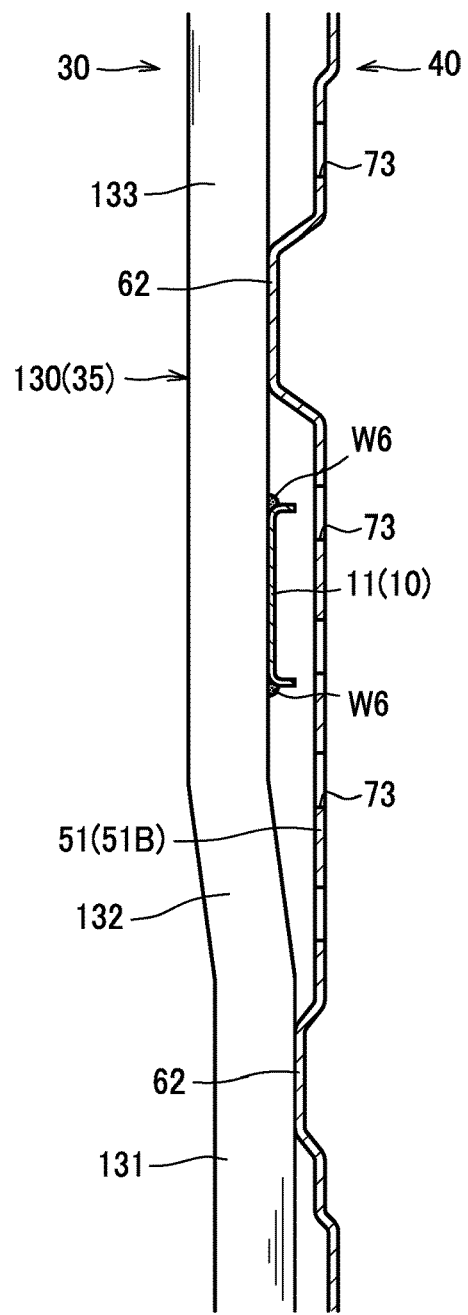
FIG. 7 is a sectional view taken along the line X-X of FIG. 6.

As seen in FIG. 3, the first bracket 10 attached in this way is located at a substantially central portion of the seat back frame F1 and disposed at the rear of the connecting frame 35 in such a position vertically and inwardly away from the upper frame 33 and the lower frame 34. As seen in FIG. 7, the attachment portion 11 is disposed between the connecting frame 35 and the back panel 40. A space is formed between the attachment portion 11 and the back panel 40.

Further, as seen in FIG. 3, in the vertical direction, the first bracket 10 is disposed in a position between the weld W51 that joins the connecting frame 35 and the upper second connecting protruding portion 62 and the weld W52 that joins the connecting frame 35 and the lower second connecting protruding portion 62, in other words, between two adjacent welds W51, W52 (i.e., joint portions). Further, as viewed from the front side, the first bracket 10 is located at a position avoiding the protruding portions 52-55 formed on the back panel 40. In other words, the protruding portions 52-55 are provided around the first bracket 10.

As seen in FIG. 8, the second bracket 20 is made by press working sheet metal, and mainly includes an attachment portion 21 joined to the upper frame 33, an anchorage portion 22 to which the seat belt retractor R1 is fixed, a connecting portion 23 connecting the attachment portion 21 and the anchorage portion 22, and a cover portion 24 extending frontward from the upper end of the attachment portion 21. The connecting portion 23 extends in an obliquely frontward and downward direction from the lower end of the attachment portion 21, and the anchorage portion 22 extends from the lower end of the connecting portion 23 in a direction substantially parallel to the attachment portion 21. Similar to the first bracket 10, a bolt 25 for fixing the seat belt retractor R1 is provided on the anchorage portion 22. In this embodiment, the diameter of the shank of the bolt 15 is larger than the diameter of the shank of the bolt 25.

The attachment portion 21 of the second bracket 20 is brought into contact with a portion on or in the proximity of the laterally central portion of the upper frame 33 from the rear side of the upper frame 33 and joined by welding to the upper frame 33, so that the second bracket 20 is attached to the pipe frame 30.

The seat belt retractor R1 is attached to the first bracket 10 and the second bracket 20, bridging a gap between the first bracket 10 and the second bracket 20. To be more specific, the seat belt retractor R1 is attached to the seat back frame F1 through the first bracket 10 and the second bracket 20 by inserting the bolt 15 through a through-opening (not shown)

formed in a lower anchorage piece R10 and fastening the bolt 15 with the nut 16 and by inserting the bolt 25 through a through-opening (not shown) formed in an upper anchorage piece R20 and fastening the bolt 25 with the nut 26.

The seat belt B1 pulled out from the seat belt retractor R1 passes through the rear side and the upper side of the second bracket 20 and is wound around a guide wire 39 fixed to the upper frame 33 and thereafter pulled out to the front side of the first seat back S21. A tongue B11 (see FIG. 1) is attached to the seat belt B1, and the end portion of the seat belt B1 is connected to an anchor (not shown) that is fixed to the vehicle body.

According to the first embodiment as described above, in contrast to the conventional car seat having a lateral frame provided between the upper frame and the lower frame and extending in a lateral direction for the attachment of the bracket, the lateral frame can be eliminated because the first bracket 10 is provided on the connecting frame 35. Eliminating the lateral frame between the upper frame and the lower frame can serve to improve the occupant's seating feeling because the occupant does not experience an uncomfortable contact feeling of the lateral frame. Further, eliminating the lateral frame makes it possible to reduce the number of parts for the seat back frame F1 and thus serves to suppress an increase in the number of the parts. Accordingly, the workload on the assembly of the seat back frame F1 can be reduced and the weight of the seat back frame F1 can be reduced. Reduction in the number of parts for the seat back frame F1 and reduction in the workload on the assembly leads to low-cost manufacturing of the seat back frame F1.

Further, the back panel 40 has protruding portions 51-55 protruding frontward, so that the stiffness of the back panel 40 constituting the seat back frame F1 can be improved and therefor the stiffness of the seat back frame F1 can be improved. Especially in this embodiment, the direction in which the first protruding portion 51 extends is different from the direction in which the second protruding portion 52 extends, and the shapes of the third protruding portion 53 and the like are different from the shape of the first protruding portion 51 and the shape of the second protruding portion 52, so that the stiffness of the seat back frame F1 can be further improved. Further, optimal stiffness can be set for each of portions of the back panel 40 by the arrangement and the combination of the first protruding portion 51, the second protruding portion 52, the third protruding portion 53 and the like.

Further, the first bracket 10 is disposed at a position avoiding the protruding portions 52-55, so that interference between the first bracket 10 and the protruding portions 52-55 of the back panel 40 can be suppressed.

Further, the seat back frame F1 includes the first pipe member 100 having a substantially U-shaped configuration, and the second pipe member 200 having a substantially U-shaped configuration. Therefore, the number of parts for the seat back frame F1 can be reduced further as compared with an alternative configuration in which the seat back frame includes, for example, a main pipe having a U-shaped configuration, an under pipe having a straight form and configured to connect lower end portions of the main pipe, and a sub-pipe having a straight form and configured to connect an upper portion of the main pipe and the under pipe. Further, since both of the first pipe member 100 and the second pipe member 200 have a substantially U-shaped configuration, and a bend structure is used where necessary as with the longitudinal pipe portions 110, 130 of the first pipe member 100, optimal stiffness and strength can be adjusted for each of portions of the seat back frame F1 without increasing (rather reducing) the number of parts for the seat back frame F1. With this configuration, for example, the structure around the longitudinal pipe member 130 (connecting frame 35) to which the first bracket 10 is attached can be reinforced more strongly. Further, a higher stiffness of the seat back frame F1 is ensured with a simple structure.

Further, since the second pipe member 200 is thinner than the first pipe member 100 and thus a large storage space for the armrest AR is ensured, the thickness of the pad material for the armrest AR can be increased, so that the cushioning feel of the armrest AR can be improved.

Further, since the first bracket 10 is provided at the rear of the connecting frame 35, it is possible to dispose the first bracket 10 in a position farther away from the occupant as compared with an alternative configuration in which the first bracket 10 is provided at the front of the connecting frame 35. Therefore, the distance between the occupant and the seat belt retractor R1 attached to the first bracket 10 can be increased. This makes it possible to increase the thickness of the pad material P1 disposed between the occupant and the seat belt retractor R1 and to further improve the occupant's seating feeling. Since the thickness of the pad material P1 is ensured, it is possible to dispose the first bracket 10 in such a position where the thickness of the pad material P1 is thinner as compared to the other portions of the seat back S2. This can improve the degree of flexibility in the attachment position for the first bracket 10.

Further, in the configuration in which the connecting frame 35 and the back panel 40 are joined together by the plurality of welds W51, W52, the first bracket 10 is disposed between two adjacent welds W51, W52 (i.e., the first bracket 10 is attached to the connecting frame 35 at a position between the weld W51 and the weld W52, where the connecting frame 35 is less likely to deform), the attachment strength of the first bracket 10 can be improved. Further, since the attachment portion 11 of the first bracket 10 is disposed between the connecting frame 35 and the back panel 40, the attachment portion 11 can be arranged compactly. Accordingly, for example, the thickness of the pad material P1 disposed between the occupant and the seat belt retractor R1 attached to the first bracket 10 can be increased, so that the occupant's seating feeling can be improved.

Second Embodiment

The second embodiment of the present invention will be described below. In this embodiment, parts different from those described in the first embodiment will be described in detail, and parts similar to those previously described in the first embodiment will be denoted by the same reference numerals and detailed description thereof will be omitted.

Figure 9:
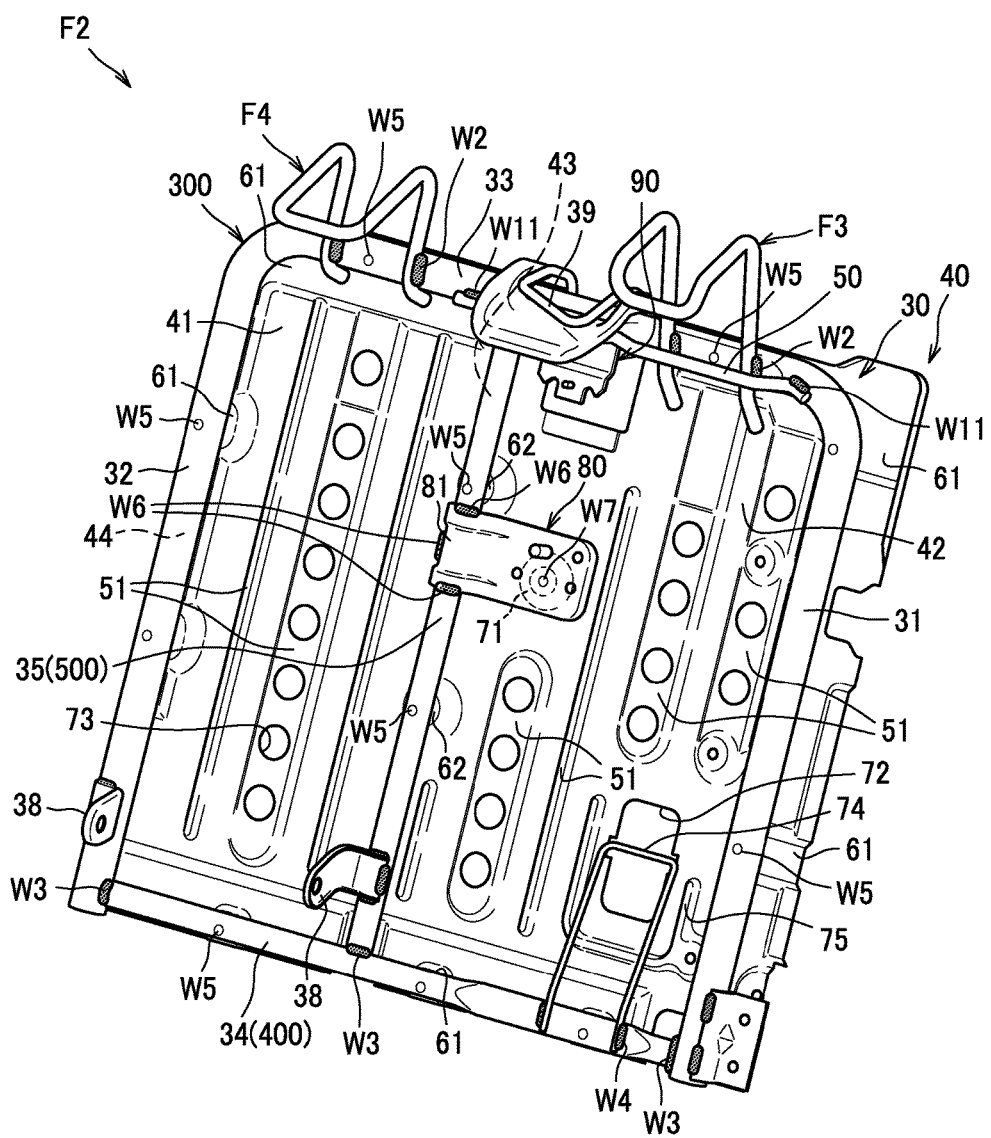
FIG. 9 is a perspective view of a seat back frame according to the second embodiment.

As seen in FIG. 9, the seat back frame F2 that constitutes a framework for the first seat back S21 mainly includes a pipe frame 30, a back panel 40 and a wire member 50.

Figure 10:
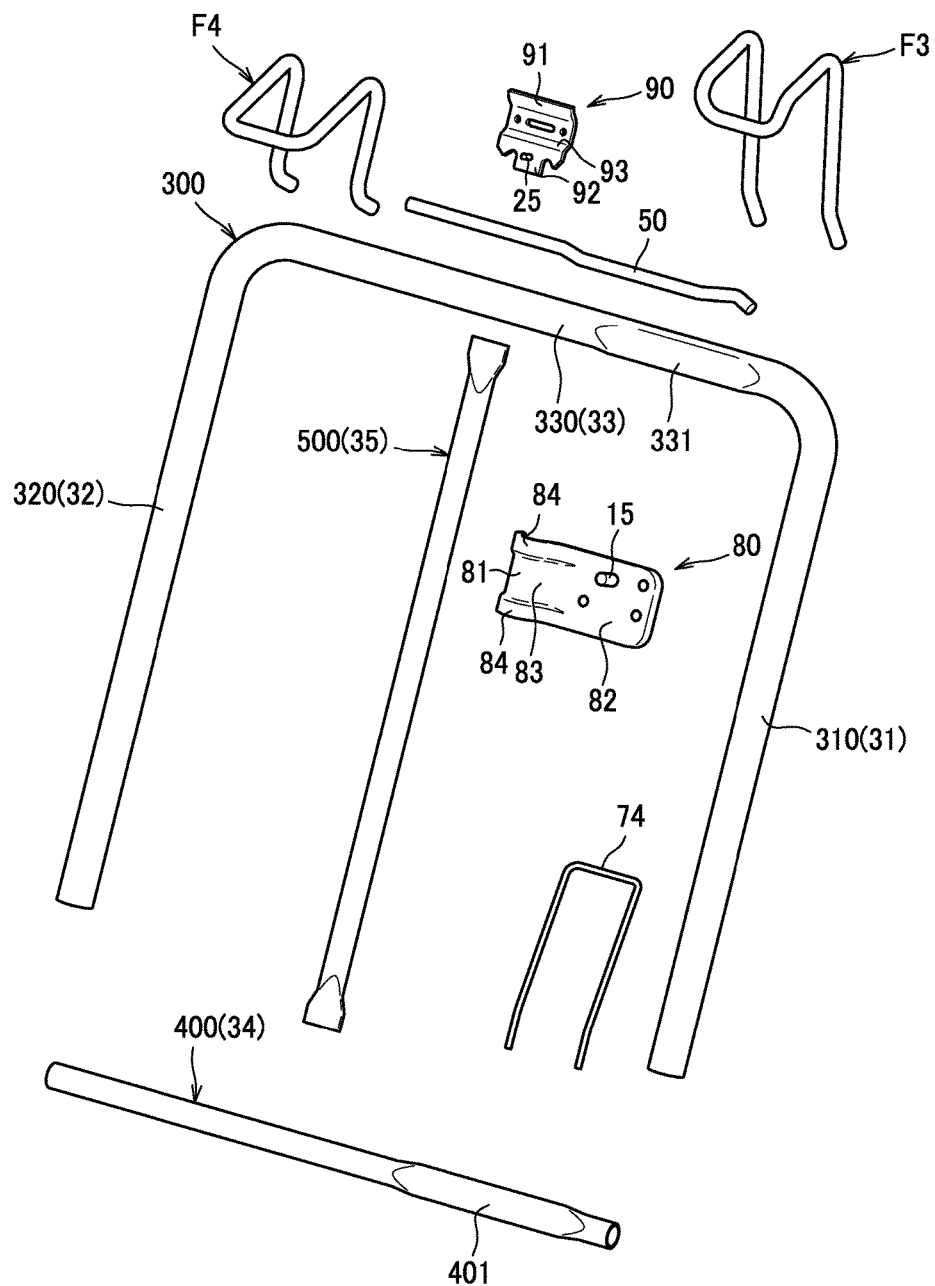
FIG. 10 is an exploded perspective view of a pipe frame according to the second embodiment.

As seen in FIG. 10, the pipe frame 30 includes a third pipe member 300, a fourth pipe member 400 and a fifth pipe member 500.

The third pipe member 300 is formed by bending a metallic pipe member into a substantially U-shaped configuration, and includes left and right longitudinal pipe portions 310, 320 and a lateral pipe portion 330 connecting upper end portions of the longitudinal pipe portions 310, 320. The third pipe member 300 is made of a pipe member thicker than the fourth pipe member 400 and the fifth pipe member 500.

The longitudinal pipe portion 310 constitutes the left side frame 31, and the longitudinal pipe portion 320 constitutes the right side frame 32.

The lateral pipe portion 330 constitutes the upper frame 33. Headrest frames F3, F4 that constitute frameworks for the headrests S3, S4 are welded to the front side of the lateral pipe portion 330 (see welds W2 in FIG. 9). The left end portion of the lateral pipe portion 330 has a flat portion 331 that is formed by flattening and deforming a part of the pipe member, and the headrest frame F3 is welded to the flat portion 331.

The forth pipe member 400 and the fifth pipe member 500 are each made from a straight pipe member having no any bent portions. The fourth pipe portion 400 constitutes a lower frame 34. The left end portion of the fourth pipe member 400 has a flat portion 401 that is formed by flattening and deforming a part of the pipe member, and a lower end portion of a tether anchor 74 is fixed by welding to the front side of the flat portion 401 (see welds W4 in FIG. 9). The fifth pipe member 500 constitutes a connecting frame 35.

As seen in FIGS. 10 and 9, the third pipe member 300, the fourth pipe member 400 and the fifth pipe member 500 are joined together to form a pipe frame 30 by welding the lower end portions of the left and right longitudinal pipe portions 310, 320 to left and right ends of the fourth pipe member 400 respectively, and by welding portions on or in the proximity of the laterally central portions of the lateral pipe portion 330 and the fourth pipe member 400 to upper and lower ends of the fifth pipe member 500 respectively (see welds W3).

As seen in FIG. 9, the wire member 50 is formed by bending a metallic rod member. The wire member 50 is joined to the upper frame 33 of the pipe frame 30 by welding the right end portion of the wire member 50 to a portion on or in the proximity of the laterally central portion of the upper frame 33 and by welding the left end portion of the wire member 50 to the left end portion of the upper frame 33 (see welds W11). Providing the wire member 50 makes it possible to enhance the stiffness of the pipe frame 30 (seat back frame F2), particularly, at the right-side portion of the upper frame 33 having the flat portion 331 (see FIG. 10).

Figure 11:
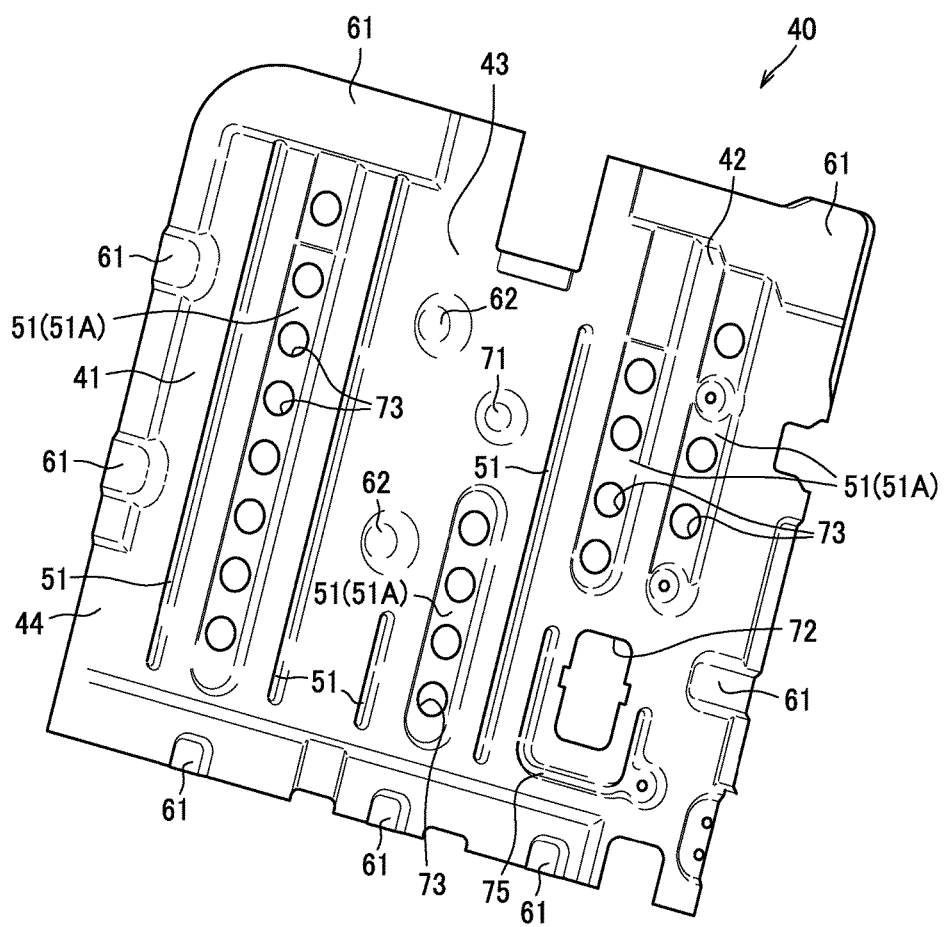
FIG. 11 is a perspective view of a back panel according to the second embodiment.

As seen in FIG. 11, the back panel 40 mainly includes first protruding portions 51, first connecting protruding portions 61, second connecting protruding portions 62, a bracket connecting portion 71 and an opening 72.

The first protruding portions 51 are provided on the first portion 41 and the second portion 42 such that they are arranged side by side in the lateral direction. A plurality of through-openings 73 are formed in each of the wider first protruding portions MA.

Two second connecting protruding portions 62 are provided on the third portion 43 such that they are arranged one above another in the vertical direction with a space provided therebetween.

One opening 72 is formed in the lower portion of the left end portion of the second portion 42. In order to ensure the stiffness around the opening 72, a sixth protruding portion 75 is provided on the peripheral portion of the opening 72. The sixth protruding portion 75 protrudes frontward and extends along the left edge portion, the lower edge portion and the right edge portion of the opening 72 to form a substantially U-shaped protrusion.

As seen in FIG. 10, the first bracket 80 mainly includes an attachment portion 81, an anchorage portion 82 and a connecting portion 83. The attachment portion 81 is formed to have a substantially circular arc-shaped surface extending along the circumferential surface of the connecting frame 35 (fifth pipe member 500). The connecting portion 83 extends in an obliquely rearward and leftward direction from the left end of the attachment portion 81 along the circumferential surface of the connecting frame 35, and the anchorage portion 82 extends leftward from the left end of the connecting portion 83. In order to enhance the stiffness of the first bracket 80, protruding portions 84 configured to protrude frontward are formed on the upper and lower end portions of the attachment portion 81 and the connecting portion 83. As in the first bracket 10 according to the first embodiment, a bolt 15 is provided on the anchorage portion 82, and edge portions of the first bracket 80 are bent rearward so as to form gentle round corner portions.

As seen in FIG. 9, the attachment portion 81 of the first bracket 80 is brought into contact with a portion on or in the proximity of the vertically central portion of the connecting frame 35 from the front side of the connecting frame 35, and the upper edge portion, the lower edge portion and the right edge portion of the attachment portion 81 are joined by welding at three welding spots to the connecting frame 35 (see welds W6), so that the first bracket 80 is attached to the front side of the connecting frame 35. Further, the anchorage portion 82 of the first bracket 80 is joined by spot welding (see welds W7) to the bracket connecting portion 71, so that the first bracket 80 is fixed to the back panel 40. It should be noted that as viewed from the font side, the first bracket 80 is disposed in a position avoiding the first protruding portions 51 provided on the back panel 40.

Figure 12:
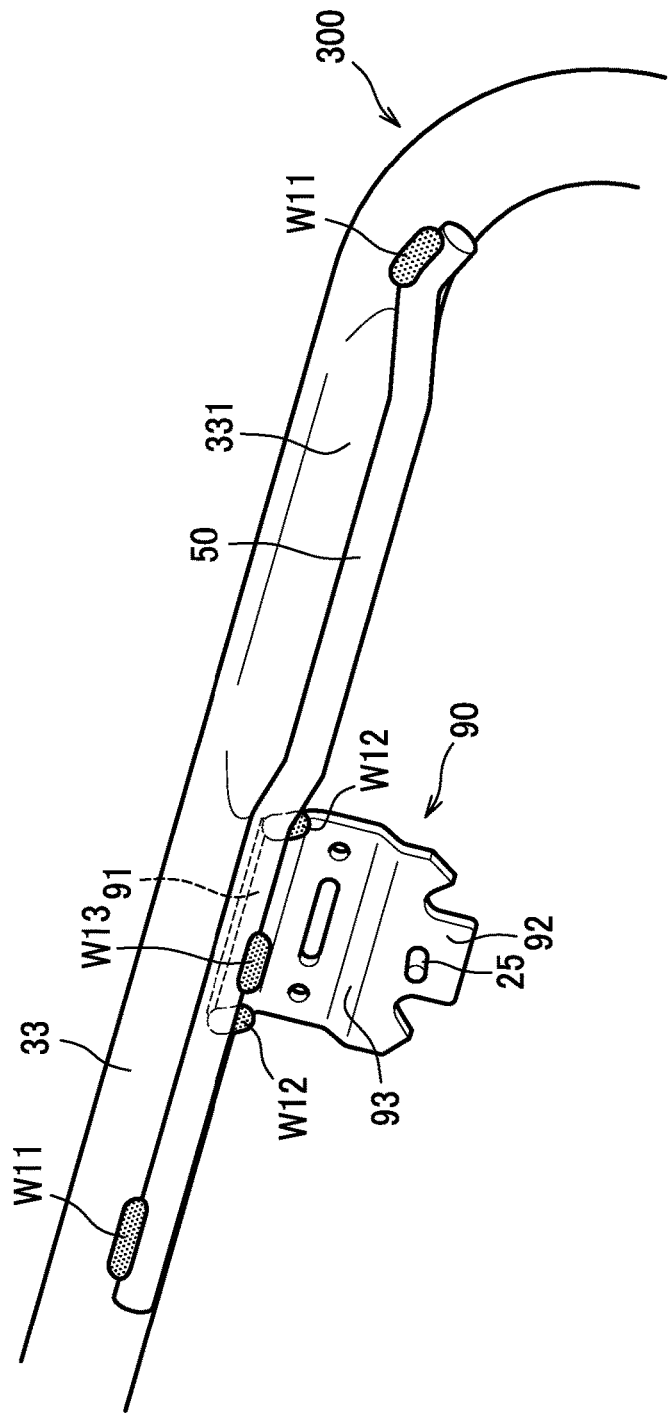
FIG. 12 is a perspective view showing a joint between an upper frame, a wire member and a second bracket.

As seen in FIG. 12, the second bracket 90 mainly includes an attachment portion 91, an anchorage portion 92 provided with a bolt 25, and a connecting portion 93 connecting the attachment portion 91 and the anchorage portion 92. The attachment portion 91 of the second bracket 90 is brought into contact with a portion on or in the proximity of the laterally central portion of the upper frame 33 from the front side of the upper frame 33, and the right and left edge portions of the attachment portion 91 are joined by welding to the upper frame 33 (see welds W12), so that the second bracket 90 is joined to the upper frame 33. Further, the right-side portion of the attachment portion 91 of the second bracket 90 is joined by welding to the wire member 50 (see weld W13), so that the second bracket 90 is joined to the wire member 50 as well. Accordingly, the upper frame 33, the wire member 50 and the second bracket 90 are joined together by welds W11-W13.

According to the second embodiment as described above, it is not necessary, as with the first embodiment, to provide a lateral frame between the upper frame 33 and the lower frame 34, so that an occupant seated on the car seat does not experience an uncomfortable contact feeling and the occupant's seating feeling can be improved. Further, since the seat back frame F2 is comprised of the reduced number of parts, the workload on the assembly of the seat back frame F2 can be reduced and the weight of the seat back frame F2 can be reduced.

Further, since the first bracket 80 is provided at the front side of the connecting frame 35, even if a sufficient space is not available at the rear side of the connecting frame 35 (between the connecting frame 35 and the back panel 40), it is possible to attach the first bracket 80 to the connecting frame 35. Further, the attachment portion 81 and the connecting portion 83 of the first bracket 80 have curved surfaces contoured to fit the connecting frame 35 consisting of the fifth pipe member 500. This makes it possible to improve the stiffness of the first bracket 80 and can serve to improve the attachment strength of the first bracket 80.

Further, since the seat back frame F2 includes the third pipe member 300 having a substantially U-shaped configuration, the fourth pipe member 400 constituting the lower frame 34, and the fifth pipe member 500 constituting the connecting frame 35, the third pipe member 300 is formed with a simple bent structure, while the fourth pipe member 400 and the fifth pipe member 500 are formed with a non-bent structure. This can lead to low-cost manufacturing of the seat back frame F2.

Further, since the upper frame 33, the wire member 50 and the second bracket 90 are joined together, the stiffness of the seat back frame F2 can be enhanced around the upper frame 33. This can serve to enhance the strength around a portion of the seat back frame F2 from which the seat belt B1 is to be pulled out.

Although preferred embodiments of the present invention have been described above, the present invention is not limited to the above-described embodiments. It is to be understood that various changes and modifications may be made to any of the specific configurations where necessary without departing from the scope of the present invention.

For example, in the first embodiment, the first pipe member 100 constitutes the left side frame 31, a part of the upper frame 33 and the connecting frame 35, whereas the second pipe member 200 constitutes the right side frame 32, the remaining part of the upper frame 33 and the lower frame 34. However, the present invention is not limited to this specific configuration. For example, the first pipe member may constitute the right side frame, a part of the upper frame and the connecting frame, and the second pipe member may constitute the left side frame, the remaining part of the upper frame and the lower frame. As an alternative, the first pipe member may constitute the left side frame, the connecting frame and a part of the lower frame, while the second pipe member may constitute the right side frame, the remaining part of the lower frame and the upper frame. As a further alternative, the first pipe member may constitute the right side frame, the connecting frame and a part of the lower frame, while the second pipe member may constitute the left side frame, the remaining part of the lower frame and the upper frame.

Further, in the second embodiment, the third pipe member 300 constitutes the left and right side frames 31, 32 and the upper frame 33, while the fourth pipe member 400 constitutes the lower frame 34. However, the present invention is not limited to this specific configuration. For example, the third pipe member may constitute the left and right side frames and the lower frame, while the fourth pipe member may constitute the upper frame.

Further, in the above-described embodiments, a plurality of first protruding portions 51 are provided on the back panel 40. However, the present invention is not limited to this specific configuration. For example, only one first protruding portion 51 may be provided on the back panel 40. Further, as long as the stiffness of the back panel is ensured, the first protruding portions may not be provided. The same can be said of the second protruding portions and the third protruding portions.

Further, in the above-described embodiments, the back panel 40 is joined to both of the first pipe member 100 and the second pipe member 200 that constitute the pipe frame 30. However, the present invention is not limited to this specific configuration. For example, as long as the joint strength between the pipe frame and the back panel is ensured, the back panel may be joined to the first pipe member only or to the second pipe member only.

Further, in the above-described embodiments, the pipe frame 30 and the back panel 40 are joined together by welding. However, the present invention is not limited to this specific configuration. For example, the pipe frame and the back panel may be joined together using fastening means such as bolts and nuts, and other means. The same can be said of the joint of the pipe members that constitute the pipe frame.

Further, in the above-described embodiments, the car seat S to be installed in an automobile is illustrated as exemplifying a vehicle seat. However, the present invention is not limited to the car seat, and may be applicable to a vehicle seat to be installed in another vehicle other than an automobile, such as a rail car, a ship and an aircraft.

It will be appreciated by a person skilled in the art that many variations, additions, modifications, and other applications may be made to what has been particularly shown and described herein by way of examples, without departing from the scope of the inventions. Therefore, it is intended that the scope of the present invention, as defined by the attached claims, includes foreseeable combination of the features, variations, additions, modifications, or applications.

What is claimed is:

1. A vehicle seat including a seat cushion, a seat back, a seat belt, and a seat belt retractor configured to retract the seat belt, the vehicle seat comprising:
   a seat back frame comprising:
      right and left side frames disposed at a distance away from each other in a lateral direction,
      an upper frame connecting an upper end portion of the right side frame and an upper end portion of the left side frame,
      a lower frame connecting a lower end portion of the right side frame and a lower end portion of the left side frame,
      a connecting frame disposed at distances away from the right and left side frames and connecting the upper frame and the lower frame, the connecting frame being made of a pipe member, and
      a plate member joined to the connecting frame at a first weld and a second weld; and
   a first bracket by which the seat belt retractor is attached to the seat back frame,
   wherein the first bracket is provided on the connecting frame at distances away from the upper frame and the lower frame, and
   wherein the first bracket is disposed between the first weld and the second weld.

2. The vehicle seat according to claim 1, wherein the first bracket is provided at a rear side of the connecting frame.

3. The vehicle seat according to claim 1, wherein the first bracket is provided at a front side of the connecting frame.

4. The vehicle seat according to claim 1, wherein the seat back frame comprises:
   a first pipe member having a U-shaped configuration and configured to form one of the right and left side frames, the connecting frame, and a part of one of the upper and lower frames; and
   a second pipe member having a U-shaped configuration and configured to form the other one of the right and left side frames, a remaining part of the one of the upper and lower frames, and the other one of the upper and lower frames, the second pipe member being connected to the first pipe member.

5. The vehicle seat according to claim 1,
wherein the right and left side frames, and one of the upper and lower frames are formed by a single U-shaped pipe member,
wherein the other one of the upper and lower frames is formed by a single pipe member that is connected to the single U-shaped pipe member, and
wherein the connecting frame is formed by another single pipe member that is connected to the single U-shaped pipe member and the single pipe member.

6. The vehicle seat according to claim 1, wherein the plate member has a first connecting protruding portion and a second connecting protruding portion that protrude frontward toward the first bracket, and the first bracket is disposed between the first connecting protruding portion and the second connecting protruding portion, and
wherein the connecting frame and the plate member are joined at the first connecting protruding portion by the first weld and at the second connecting portion by the second weld.

7. A vehicle seat including a seat cushion, a seat back, a seat belt, and a seat belt retractor configured to retract the seat belt, the vehicle seat comprising:
a seat back frame comprising:
right and left side frames disposed at a distance away from each other in a lateral direction,
an upper frame connecting an upper end portion of the right side frame and an upper end portion of the left side frame,
a lower frame connecting a lower end portion of the right side frame and a lower end portion of the left side frame,
a connecting frame disposed at distances away from the right and left side frames and connecting the upper frame and the lower frame, the connecting frame being made of a pipe member, and
a plate member joined to the connecting frame; and
a first bracket by which the seat belt retractor is attached to the seat back frame,
wherein the plate member has a bracket connecting portion protruding frontward toward the first bracket,
wherein as viewed from a front side, the bracket connecting portion is disposed at a position not overlapping the connecting frame, and
wherein the first bracket is attached to the connecting frame and the bracket connecting portion at distances away from the upper frame and the lower frame.

8. The vehicle seat according to claim 7, wherein the first bracket is provided at a front side of the connecting frame.

9. The vehicle seat according to claim 7, wherein the seat back frame comprises:
a first pipe member having a U-shaped configuration and configured to form one of the right and left side frames, the connecting frame, and a part of one of the upper and lower frames; and
a second pipe member having a U-shaped configuration and configured to form the other one of the right and left side frames, a remaining part of the one of the upper and lower frames, and the other one of the upper and lower frames, the second pipe member being connected to the first pipe member.

10. The vehicle seat according to claim 7, wherein the right and left side frames, and one of the upper and lower frames are formed by a single U-shaped pipe member,
wherein the other one of the upper and lower frames is formed by a single pipe member that is connected to the single U-shaped pipe member, and
wherein the connecting frame is formed by another single pipe member that is connected to the single U-shaped pipe member and the single pipe member.

11. The vehicle seat according to claim 7, wherein the first bracket is provided at a rear side of the connecting frame.

12. A vehicle seat including a seat cushion, a seat back, a seat belt, and a seat belt retractor configured to retract the seat belt, the vehicle seat comprising:
a seat back frame comprising:
right and left side frames disposed at a distance away from each other in a lateral direction,
an upper frame connecting an upper end portion of the right side frame and an upper end portion of the left side frame,
a lower frame connecting a lower end portion of the right side frame and a lower end portion of the left side frame, and
a connecting frame disposed at distances away from the right and left side frames and connecting the upper frame and the lower frame, the connecting frame being made of a pipe member; and
a first bracket and a second bracket by which the seat belt retractor is attached to the seat back frame,
wherein the first bracket is attached to the connecting frame at distances away from the upper frame and the lower frame, and the second bracket is attached to the upper frame, and
wherein the seat belt retractor is attached to the first bracket and second bracket, bridging a gap formed between the first bracket and the second bracket.

13. The vehicle seat according to claim 12, wherein the first bracket is provided at a front side of the connecting frame.

14. The vehicle seat according to claim 12, wherein the seat back frame comprises:
a first pipe member having a U-shaped configuration and configured to form one of the right and left side frames, the connecting frame, and a part of one of the upper and lower frames; and
a second pipe member having a U-shaped configuration and configured to form the other one of the right and left side frames, a remaining part of the one of the upper and lower frames, and the other one of the upper and lower frames, the second pipe member being connected to the first pipe member.

15. The vehicle seat according to claim 12, wherein the right and left side frames, and one of the upper and lower frames are formed by a single U-shaped pipe member,
wherein the other one of the upper and lower frames is formed by a single pipe member that is connected to the single U-shaped pipe member, and
wherein the connecting frame is formed by another single pipe member that is connected to the single U-shaped pipe member and the single pipe member.

16. The vehicle seat according to claim 12, wherein the first bracket is provided at a rear side of the connecting frame.

* * * * *